(12) United States Patent
Kudva et al.

(10) Patent No.: US 9,120,700 B2
(45) Date of Patent: Sep. 1, 2015

(54) NON-CONTACT ETCHING OF MOVING GLASS SHEETS

(75) Inventors: Gautam Narendra Kudva, Horseheads, NY (US); Chih Yuan Lu, Gangshan Township, Kaohsiung County (TW); Weiwei Luo, Shizuoka (JP); Yoshihiro Nakamura, Shizuoka (JP); Tetsuzou Yamada, Shizuoka (JP)

(73) Assignee: Corning Incorporated, Corning, NY (US)

( * ) Notice: Subject to any disclaimer, the term of this patent is extended or adjusted under 35 U.S.C. 154(b) by 864 days.

(21) Appl. No.: 12/732,597

(22) Filed: Mar. 26, 2010

(65) Prior Publication Data

US 2011/0236630 A1    Sep. 29, 2011

(51) Int. Cl.
  *B32B 3/00* (2006.01)
  *C03C 15/00* (2006.01)
(52) U.S. Cl.
  CPC .......... *C03C 15/00* (2013.01); *Y10T 428/24355* (2015.01)
(58) Field of Classification Search
  USPC ......................................................... 428/141
  See application file for complete search history.

(56) References Cited

U.S. PATENT DOCUMENTS

| 3,338,696 A | 8/1967 | Dockerty ........................ 65/145 |
| 3,682,609 A | 8/1972 | Dockerty ........................... 65/83 |
| 5,792,327 A | 8/1998 | Belscher et al. ............... 204/192 |
| 5,851,366 A | 12/1998 | Belscher et al. .......... 204/192.26 |
| 2005/0019504 A1 * | 1/2005 | Bi et al. ......................... 427/596 |
| 2006/0033899 A1 | 2/2006 | Hazelton et al. ................ 355/53 |
| 2007/0271756 A1 | 11/2007 | Aoki et al. ..................... 29/281.5 |
| 2009/0226671 A1 * | 9/2009 | Yanase et al. ................. 428/156 |
| 2010/0291346 A1 * | 11/2010 | Hawtof et al. ................ 428/141 |

FOREIGN PATENT DOCUMENTS

| JP | 05-036658 | 2/1993 | ............ H01L 21/304 |
| JP | 10-158866 | 6/1998 | ................ C23F 1/08 |
| JP | 2001-213517 | 8/2001 | ............. B65G 49/07 |

(Continued)

OTHER PUBLICATIONS

Varshneya, Arun K., "Flat Glass", Fundamentals of Inorganic Glasses, Academic Press, Inc., Boston, 1994, Chapter 20, Section 4.2, 534-540.

*Primary Examiner* — Maria Veronica Ewald
*Assistant Examiner* — Laura Auer
(74) *Attorney, Agent, or Firm* — Maurice Klee; Jeffrey A. Schmidt

(57) ABSTRACT

Methods and apparatus are disclosed for etching flexible glass sheets (13) in which the sheets (13) are transported in a vertical or near vertical orientation past non-contact, liquid-ejecting bearings (3) which apply an etching solution (e.g., an aqueous $NaF/H_3PO_4$ solution) to one or both sides of the sheets (13). In certain embodiments, the uppermost liquid-ejecting bearing (3) is above the top edge of the sheet (13) and thus is able to apply etching solution to the top of the sheet. In other embodiments, a top shower (11), which includes a set of spray nozzles (21) located above and distributed along the length of the apparatus, is used to apply etching solution to the top of the sheet (13). Using the disclosed methods and apparatus, glass sheets (13) produced by a fusion process are provided which have areas greater than five square meters and average surface roughness values in the range of 0.5 nanometers to 1.1 nanometers.

7 Claims, 12 Drawing Sheets

(56) References Cited

FOREIGN PATENT DOCUMENTS

| JP | 2004-054285 A | 2/2004 | |
| JP | 2004-203668 | 7/2004 | ............ C03C 23/00 |
| JP | 2005-255478 A | 9/2005 | |
| JP | 2007-246287 | 9/2007 | ............ B65G 49/06 |
| JP | 2008001589 A * | 1/2008 | |
| JP | 2008-120638 A | 5/2008 | |

* cited by examiner

NON-CONTACT ETCHING OF MOVING GLASS SHEETS

FIELD

This disclosure relates to methods and apparatus for etching glass sheets, e.g., the glass sheets used as substrates in the manufacture of liquid crystal displays (LCDs). More particularly, the disclosure relates to etching one or both of the major surfaces of a glass sheet without mechanical contact with those surfaces. Even more particularly, the disclosure relates to performing such etching while transporting the glass sheet in a substantially vertical orientation.

BACKGROUND

The process of manufacturing substrates for liquid crystal displays includes a number of steps in which glass sheets need to be supported and conveyed (transported) without damage to the sheet's major surfaces and, in particular, without damage to the sheet's "quality" surface upon which components of the display, e.g., thin film transistors and color filters, will be formed. For example, during the substrate manufacturing process, sheets need to be cut to size, edge ground, washed, and packaged and shipped or otherwise provided to the display manufacturer.

As sheet size has grown from a length of 1 meter to greater than 2 meters without a corresponding increase in sheet thickness, the lateral stiffness of the sheet has significantly decreased. At the same time, transport speed requirements have either remained constant or increased. Thus, the problem of transporting glass substrates for liquid crystal displays as it exists today can be described as trying to move a large glass sheet whose mechanical properties are not unlike those of tissue paper without touching the major surfaces of the sheet.

The glass sheets produced by the fusion process (see below) have extremely smooth surfaces. In practice, it has been found that a very smooth surface finish can sometimes be a contributing factor towards electrostatic discharge in the display manufacturing process. In such cases, it is has been found helpful to etch the surface of the sheet to reduce its smoothness. Only a light etch is needed to substantially reduce the probability of an electrostatic discharge. Accordingly, the etching can be performed without substantially impairing the ability of the glass sheet to transmit light. In addition to addressing the electrostatic discharge problem, an acid etch treatment can be also be useful in improving the bond between the metal films used in the LCD manufacturing process and the glass substrate.

In the past, it has been believed that etching of a major surface of a moving glass sheet required physical contact of the sheet with a roller. Specifically, it was believed that rollers were needed in order to achieve uniform etching. U.S. Patent Publication No. 2007/0271756 and JP 2004-203668 disclose such roller-based etching. Both of these references use rollers to apply an acid solution, even though they use water to support the glass sheet at other places in their overall processes.

As discussed and illustrated below, in accordance with the present disclosure, it has been surprisingly found that physical contact with the major surfaces of a moving glass sheet is not required for etching. In particular, it has been found that a highly uniform etch can be achieved during transport of large glass sheets without any physical contact with the major surfaces of the sheets. This is an important result since physical contact runs the risk of damaging and/or contaminating the surface of the glass.

SUMMARY

In accordance with a first aspect, a method is disclosed for conveying a glass sheet (13) in a substantially vertical orientation and simultaneously increasing the surface roughness of at least one of the sheet's major surfaces which includes:

(a) providing a moving conveyor (2) configured to contact the bottom edge of the sheet (13) and move the sheet (13) at a conveyance speed;

(b) providing a plurality of non-contact bearings (3), each bearing (3) being configured to eject liquid (40) from a plurality of orifices (22); and (c) contacting the bottom edge of the sheet (13) with the moving conveyor (2) and moving the sheet (13) at the conveyance speed while ejecting liquid (40) from the plurality of non-contact bearings (3);

wherein the liquid (40) is an etching solution and the method includes applying etching solution (40) to a top portion of the sheet (13) from (i) one or more non-contact bearings (3) located above the top edge of the sheet (13), (ii) a top shower (11), or (iii) one or more non-contact bearings (3) located above the top edge of the sheet (13) and a top shower (11).

In accordance with a second aspect, apparatus is disclosed for conveying a glass sheet (13) in a substantially vertical orientation and simultaneously increasing the surface roughness of at least one of the sheet's major surfaces which includes:

(a) a moving conveyor (2) configured to contact the bottom edge of the sheet (13) and move the sheet (13) at a conveyance speed;

(b) a plurality of non-contact bearings (3), each bearing being configured to eject an etching solution (40) from a plurality of orifices (22); and (c) a top shower (11) located above the plurality of non-contact bearings (3) and configured to apply etching solution (40) to a top portion of the sheet (13).

In accordance with a third aspect, a glass sheet (13) produced by a fusion process is disclosed which has first and second major surfaces each of which has an area greater than five square meters wherein at least one of the first and second major surfaces has an average surface roughness over at least the central 90% of its area which is in the range of 0.5 nanometers to 1.1 nanometers.

The reference numbers used in the above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 1 is a front view and FIG. 2 is a side view. The apparatus of FIGS. 1 and 2 does not employ a top shower since the uppermost liquid-ejecting bearing is above the top edge of the glass sheet.

FIG. 8 is a front view and FIG. 9 is a side view.

DETAILED DESCRIPTION

The present disclosure provides methods and apparatus for etching glass sheets in which the sheet is transported in a substantially vertical orientation past non-contact, liquid-ejecting bearings which apply an etching solution (also referred to herein as an "etching liquid") to one or both sides of the sheets. In certain embodiments, the uppermost liquid-ejecting bearing is above the top edge of the sheet and thus is able to apply etching solution to the top of the sheet. In other embodiments, a "top shower," which comprises a set of spray nozzles located above and distributed along the length of the apparatus, is used to apply etching solution to the top of the sheet. The top shower is used to achieve substantially uniform etching in cases where the uppermost liquid-ejecting bearing is located below the top edge of the sheet. Although not usually necessary, a top shower can also be used in cases where the uppermost liquid-ejecting bearing is located above the sheet's top edge.

The glass sheet being etched is preferably suitable for use as a substrate in the manufacture of flat panel displays, such as LCD displays. At present, the largest substrates being provided to flat panel display manufacturers are known as "Gen 10" substrates and have dimensions of 2850 mm×3050 mm×0.7 mm (major surface area>8.5 square meters). The etching systems disclosed herein can be used with these substrates, as well as with larger substrates that may be developed in the future and smaller substrates which have been developed in the past, e.g., the etching systems can be used with "Gen 8" substrates which have dimensions of 2160 mm×2460 mm×0.7 mm (major surface area>5.0 square meters).

The following discussion is organized into four sections: (A) Non-Contact, Liquid-Ejecting Bearings, (B) Top Shower, (C) Etching Solutions, and (D) Fusion Process. Thereafter, non-limiting examples are provided which illustrate, among other things, the ability of the disclosed etching systems to achieve a high level of etch uniformity for Gen 10 substrates.

A. Non-Contact, Liquid-Ejecting Bearings

Figures 1, 2:
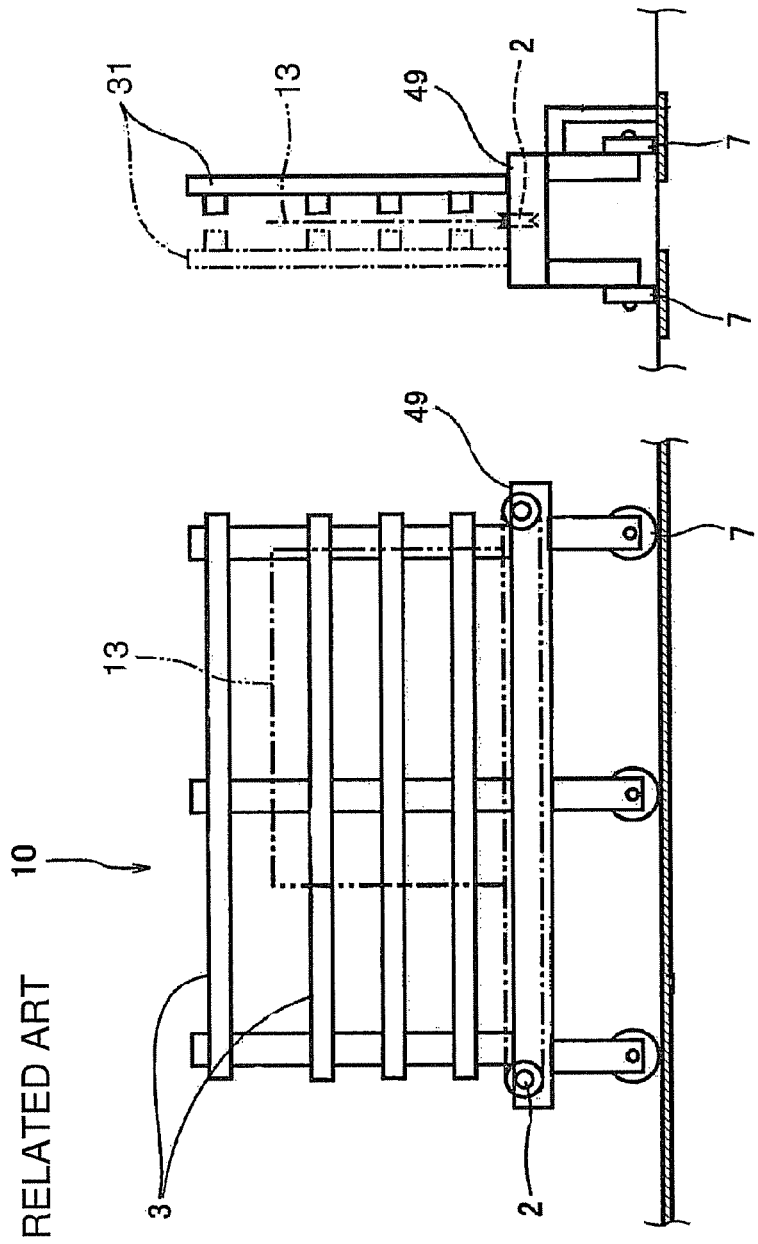
FIGS. 1 and 2 are schematic drawings of etching apparatus for a glass sheet employing an array of non-contact, liquid-ejecting bearings.

FIGS. 1 and 2 show a representative embodiment of apparatus 10 for etching a glass sheet 13 using non-contact, liquid-ejecting bearings 3. As shown in these figures, an array of bearings 3 are carried by supports 31. The supports, in turn, are carried by platform 49 which may include casters 7 for transporting the apparatus to different locations in a manufacturing plant.

The number of non-contact bearings used in any particular application, as well as the lengths of the individual bearings, will depend on the size of the glass sheet being conveyed, e.g., in the case of Gen 10 substrates, a preferred embodiment employs an array having on the order of 10 bearings, each bearing having a length of 1.5 meters. More or less bearings, as well as longer and shorter bearings, can, of course, be used as desired. For example, more bearings can be used if a glass sheet is being transported in a portrait orientation as opposed to a landscape orientation. In general terms, the bearings preferably have a vertical height in the range of 50-150 millimeters and, when an array of bearings is used, the vertical spacing between the bearings is preferably in the range of 200-400 millimeters.

Supports 31 may hold the bearings in a vertical orientation as shown in FIGS. 1 and 2 or at an angle displaced from vertical, e.g., at an angle in the range of 1-20° from vertical.

(As used herein, the phrase "a substantially vertical orientation" means an orientation between 0° and 20° from vertical.) A vertical orientation is generally preferred.

As shown in FIGS. 1 and 2, platform 49 includes conveyor 2, e.g., a V-shaped or U-shaped belt, for engaging the bottom edge of sheet 13. The conveyor is driven by, for example, an electric motor (not shown) at the desired conveyance speed for the glass sheet. The conveyance speed will depend on the particular application.

Figure 10:
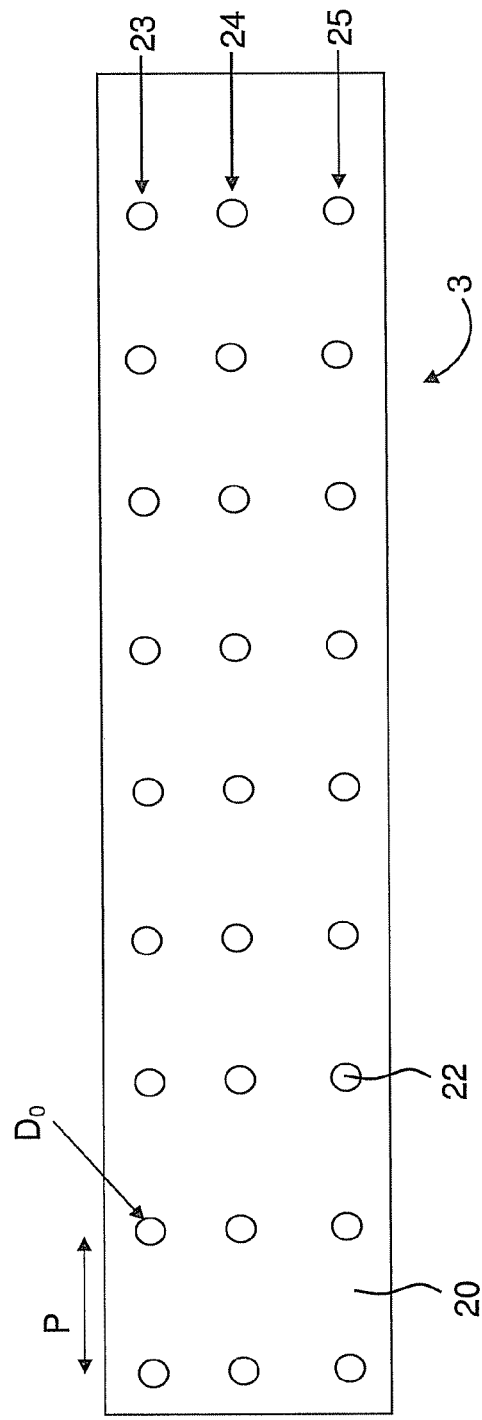
FIG. 10 shows the front face of a non-contact, liquid-ejecting bearing.

FIG. 10 shows the front surface (sheet facing surface) 20 of a representative liquid-ejecting bearing 3. As can be seen in this figure, the front surface includes a plurality of orifices 22 arranged, in this case, in three rows 23,24,25, with each row having the same number of orifices and with the orifices in adjacent rows being aligned vertically. Also, in this figure, the orifices have a uniform size (i.e., a uniform diameter $D_0$). This arrangement has been found to work successfully in practice, but numerous variations of the arrangement can be used if desired. As representative examples, the liquid-ejecting bearing can include more or less than three rows of orifices, the various rows can have different numbers of orifices, the orifices in adjacent rows can be staggered instead of vertically aligned, and the orifice sizes and the horizontal spacings (pitches) between some or all of the orifices can have different values. Also, the orifices need not be circular, in which case rather than being the orifice's diameter, the orifice's size is its maximum cross-sectional dimension.

During use, the orifices of bearing 3 are connected to a source of pressurized etching liquid (etching solution). For example, a pump can be used to feed pressurized liquid from a reservoir to a plenum which distributes the liquid to the various orifices, e.g., through flexible tubes connected to the entrance ends of the orifices on the back surface of the bearing. A wide variety of commercially-available equipment, well known to those skilled in the art, can be used to provide the pressurized liquid. Alternatively, customized equipment can be constructed if desired.

The non-contact bearing(s) may be used on only one side of the sheet (see the solid lines in FIG. 2) or may be disposed on both sides of the sheet (see the solid and dashed lines in FIG. 2). Bearings on both sides of the sheet is preferred.

During use, the etching liquid emitted from the bearing(s) forms a membrane or film that supports the glass sheet so that it does not contact the front surface of the bearing(s). More particularly, the bearing(s) employ localized flow acceleration to create a negative pressure and hence a suction force to hold the glass sheet against the bearing during transport. FIGS. 3 through 7 illustrate the phenomena being employed. In these figures, 100 is an area of high positive pressure (the impingement point of the liquid), 110 is a region of low negative pressure resulting from local acceleration of the liquid tangential to the glass surface, and 120 is a region of low positive pressure at the periphery. For purposes of illustration, the positive and negative regions shown in these figures were calculated for a single orifice without surrounding orifices. The area shown each of FIGS. 3 through 7 is 50 mm×50 mm. The calculations were performed using the commercially-available fluid dynamics program sold under the FLUENT trademark by ANSYS, Inc. (Canonsburg, Pa.). Other programs, including non-commercial programs, can, of course, be used to make the calculations shown in FIGS. 3 through 7, as well as the other calculations discussed herein.

Figure 3:
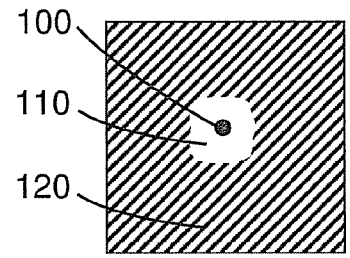
FIGS. 3 through 7 show calculated plots of the pressure distribution produced on a glass sheet by the flow of liquid out of an orifice for various orifice-to-sheet spacings and liquid flow rates. Table 1 sets forth the particular parameters used for each of FIGS. 3 through 7.
Figure 4:
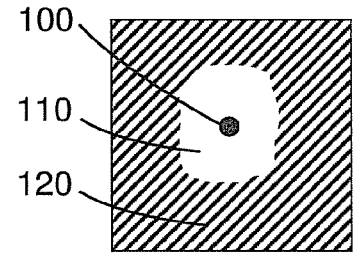
Figure 5:
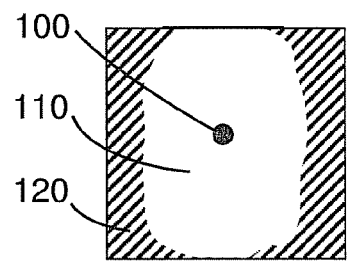
Figure 6:
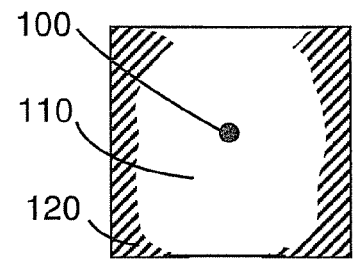
Figure 7:
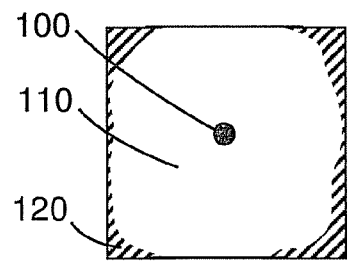

FIGS. 3 though 7 show the distributions of positive and negative pressures for various combinations of 1) the spacing between the exit end of the orifice and the substrate's surface and 2) the flow rate through the orifice. Table 1 sets forth the specific values used, as well as the total integrated pressure (total force) at the surface of the substrate. A positive total force means that the sheet is being pushed away from the orifice (repelled from the bearing), while a negative total force means that the sheet is being pulled towards the orifice (attracted to the bearing).

As illustrated by FIGS. 3 through 7 and Table 1, positive and negative net forces can be achieved for various combinations of orifice-to-sheet spacings and flow rates. In particular, this data shows that positive forces (repulsive forces) can be achieved for close spacings and negative forces (attractive forces) for large spacings. As a result, an equilibrium point (equilibrium spacing) can be identified at which the sheet is neither pulled toward nor pushed away from the orifice. For orifice-to-sheet spacings smaller than the equilibrium spacing, the sheet is pushed away from the orifice back towards the equilibrium point. For orifice-to-sheet spacings greater than the equilibrium spacing, the sheet is pulled back towards the equilibrium point. In this way, the orifice-to-sheet spacing will hover around the equilibrium spacing.

In particular, the orifice-to-sheet spacing will hover around the equilibrium spacing as the sheet is transported past the orifice. Such transporting will cause the spacing between the sheet and the orifice to change over time as a result of 1) vibration of the moving sheet and/or 2) bowing, waviness, warp, or other non-flat surface characteristics of the sheet. Because the net force applied to the sheet by the liquid ejected from the orifice changes sign at the equilibrium point, these variations in the orifice-to-sheet spacing can be accommodated by setting the orifice parameters, including the liquid flow rate, at values which produce an equilibrium point and attractive/repulsive forces on either side of the equilibrium point that can hold the sheet on the bearing notwithstanding the inevitable variations in the orifice-to-sheet spacing.

The data of FIGS. 3 through 7 is for a single orifice. In practice, a single orifice will not generate sufficient force to hold a moving glass sheet on a liquid-ejecting bearing. Rather, an array of orifices are needed. More generally, arrays of liquid-ejecting bearings, e.g., two or more liquid-ejecting bearings arranged above one another (see FIGS. 1 and 2), are typically used in transporting glass sheets, especially as the size of the sheet increases. Each liquid-ejecting bearing will have its own array of orifices, which may be the same for all of the bearings or may differ between bearings, if desired.

The effects of an array of orifices on a glass sheet were found to be substantially more complex than the effects of a single orifice. Similarly, an array of liquid-ejecting bearings was found to exhibit more complex behavior than a single liquid-ejecting bearing. To study these effects, experiments were performed using equipment of the type shown schematically in FIGS. 8 and 9. In these figures, 13 is the glass sheet, 2 is a conveyor for the sheet, 3 is a liquid-ejecting bearing, 14 is a force transducer, 15 is a position sensor, 18 is a transducer/sensor support, 17 are leads to the transducers and sensors, and 16 is equipment for recording the output of the transducers and sensors.

FIG. 10 shows a representative liquid-ejecting bearing 3 used in the experiments. In addition to the structure of the bearing, the figure also shows parameters that were varied during the experiments, i.e., the average horizontal pitch parameter P, i.e., the average center-to-center spacing between orifices in the direction of motion of the glass sheet, and the average orifice size parameter, specifically, in this case, the average diameter $D_0$ of the orifices.

Figure 11:
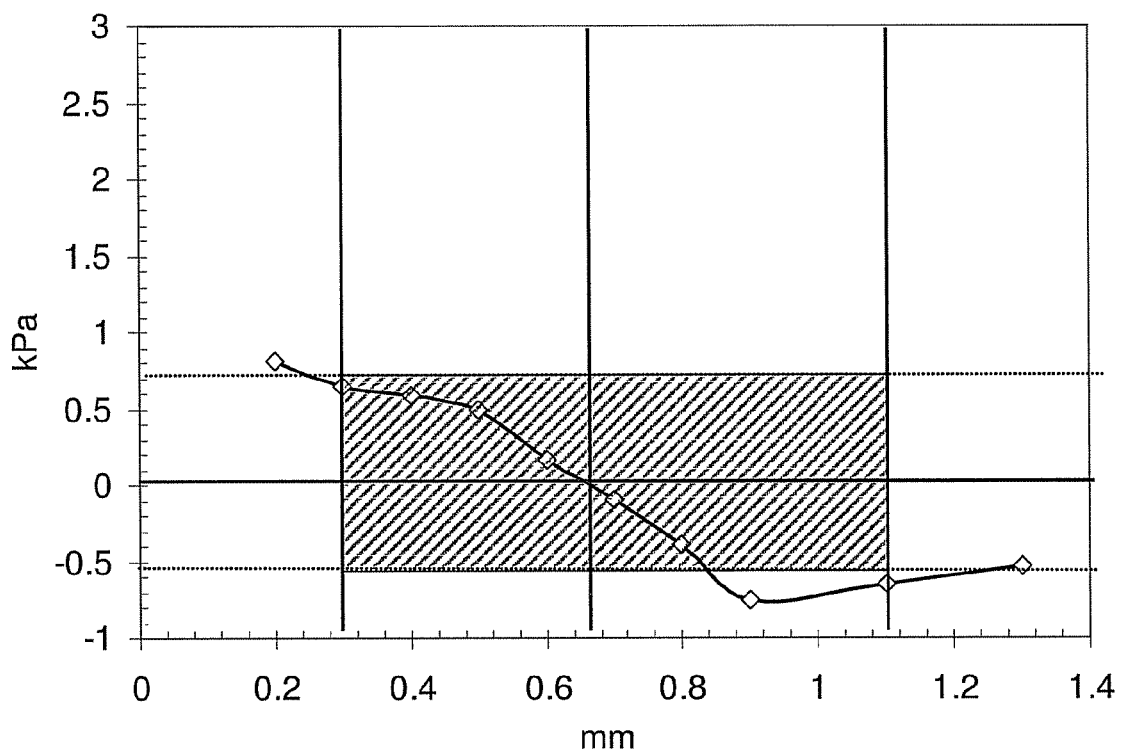
FIG. 11 is a plot of pressure/orifice in kilopascals (kPa) at the surface of a glass sheet (y-axis) versus spacing in millimeters (mm) between the glass sheet and the front face of a non-contact, liquid-ejecting bearing (x-axis). The shaded area of this figure illustrates a representative operating window for use of the bearing.

FIG. 11 is a plot of the average pressure in kilopascals (kPa) applied to a glass sheet by an orifice of a bearing's array of orifices versus the spacing in millimeters (mm) between the front surface of the liquid-ejecting bearing and the glass sheet (or, equivalently, between the exit ends of the orifices and the glass sheet since the exit ends of the orifices are typically flush with the surface of the bearing). In this figure, as well as in FIGS. 12-14, positive pressures represent repulsion between the bearing and the sheet and negative pressures represent attraction. The hatched portion of this plot shows a representative operating window for the bearing, i.e., the portion of the pressure-versus-spacing curve over which transport of glass sheets can be performed reliably using the bearing.

Figures 8, 9:
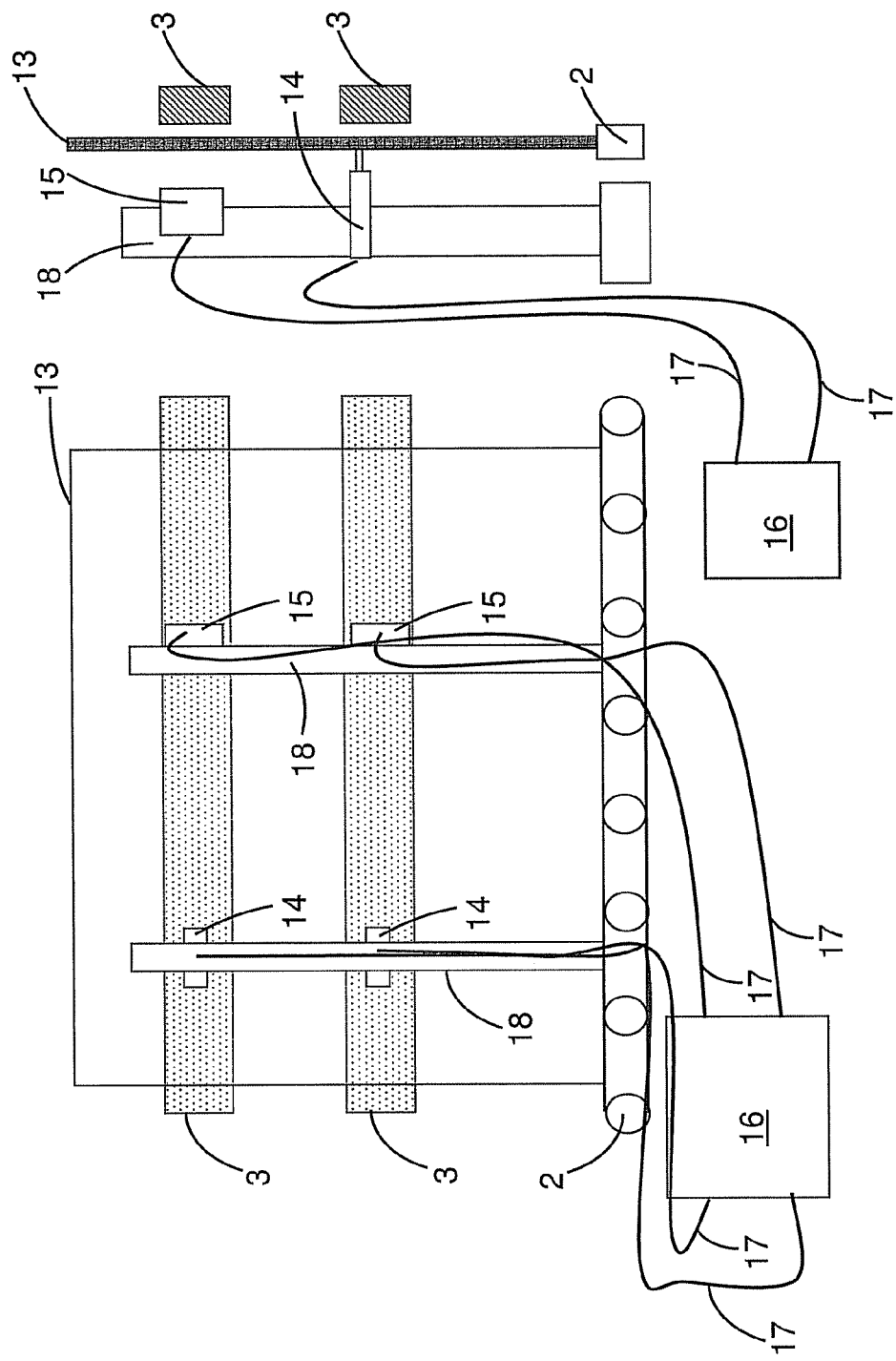
FIGS. 8 and 9 are schematic drawings of apparatus used in testing the effects of various parameters on the conveyance of glass sheets using non-contact, liquid-ejecting bearings.
Figure 12:
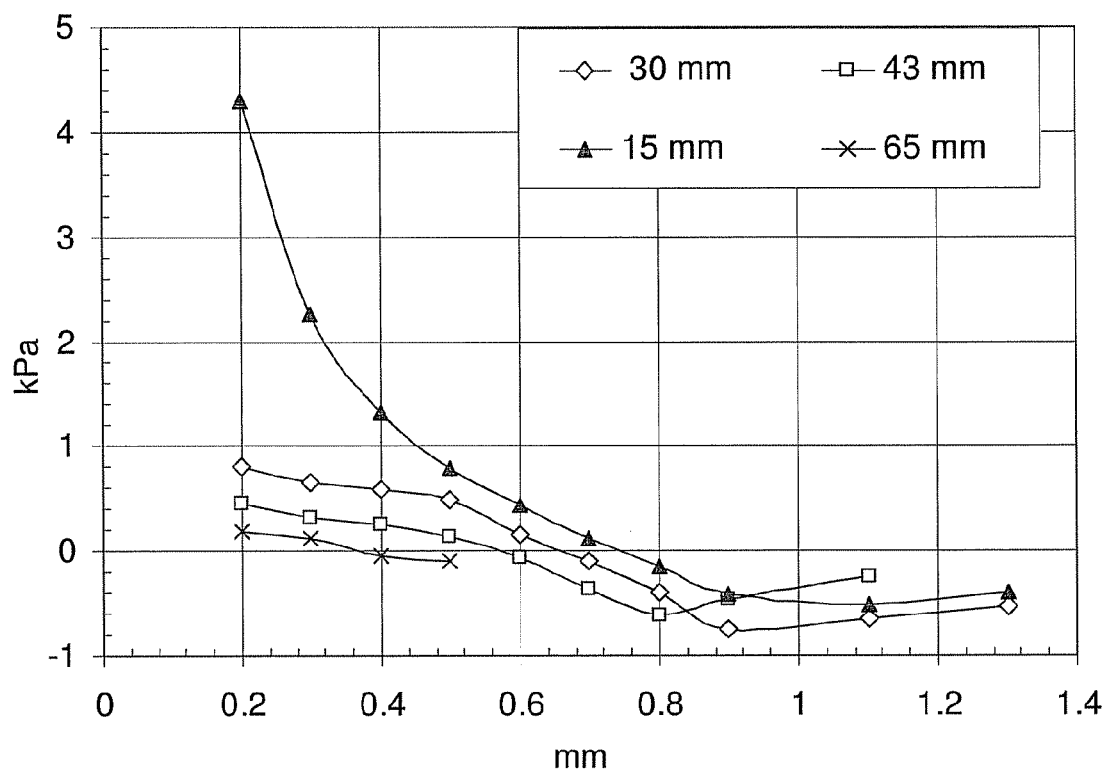
FIG. 12 is a plot of pressure/orifice in kilopascals (kPa) at the surface of a glass sheet (y-axis) versus spacing in millimeters (mm) between the glass sheet and the front face of a non-contact, liquid-ejecting bearing (x-axis) for average horizontal pitches of 15, 30, 43, and 65 millimeters.
Figure 13:
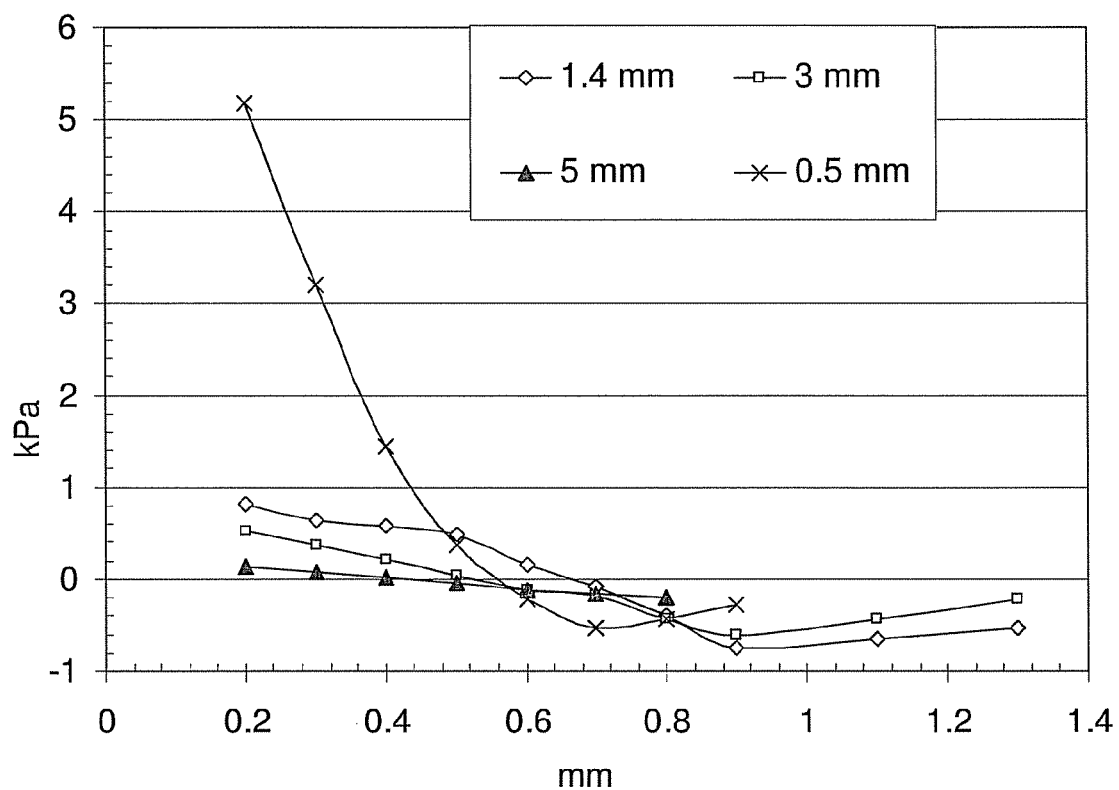
FIG. 13 is a plot of pressure/orifice in kilopascals (kPa) at the surface of a glass sheet (y-axis) versus spacing in millimeters (mm) between the glass sheet and the front face of a non-contact, liquid-ejecting bearing (x-axis) for average orifice sizes of 0.5, 1.4, 3.0, and 5.0 millimeters.
Figure 14:
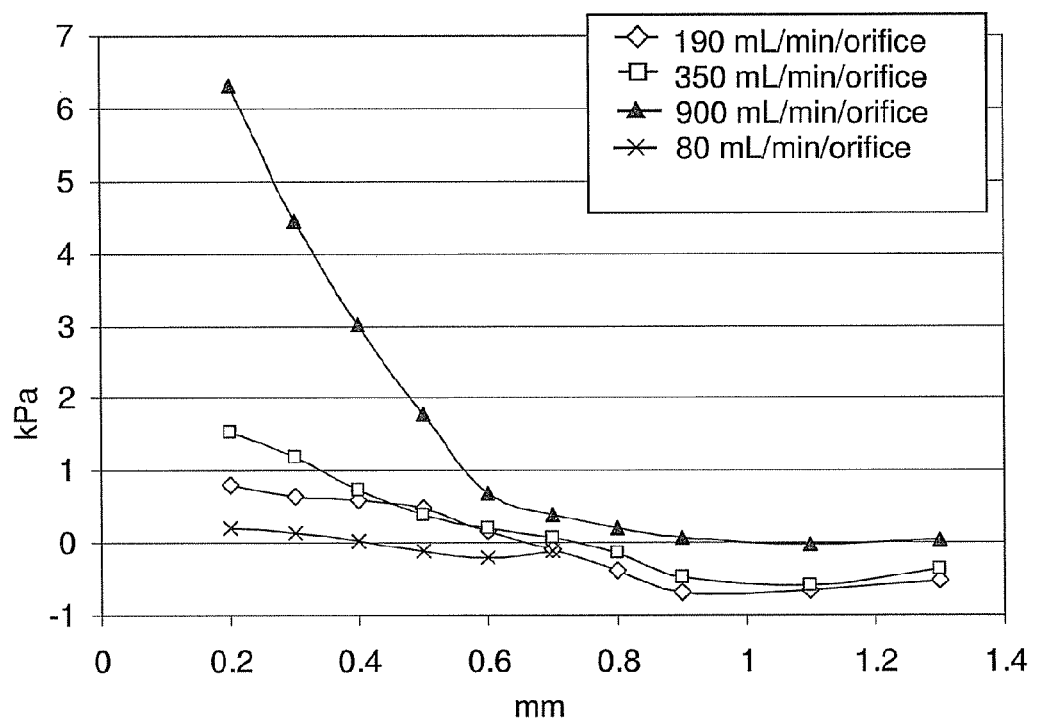
FIG. 14 is a plot of pressure/orifice in kilopascals (kPa) at the surface of a glass sheet (y-axis) versus spacing in millimeters (mm) between the glass sheet and the front face of a non-contact, liquid-ejecting bearing (x-axis) for average flow rates of 80, 190, 350, and 900 milliliters/minute/orifice.

Using equipment of the type shown in FIGS. 8-9 and a bearing of the type shown in FIG. 10, pressure-versus-spacing curves were determined for a wide range of potential parameters. As a result of these experiments, it was found that the key parameters are: 1) the average horizontal pitch between orifices, 2) the average size of the orifices, and 3) the average flow rate through the orifices, where in each case, the averages are over all of the orifices of the bearing. It was further found that specific ranges of values for these parameters produced practical operating windows of the type shown in FIG. 11. FIGS. 12, 13, and 14 show representative data which illustrates the ranges for average horizontal pitch, average orifice size, and average flow rate, respectively.

As shown in FIG. 12, an average horizontal pitch of 15 millimeters (solid triangle data points) produced unacceptably large repulsive forces on the glass sheet as the sheet approached the surface of the bearing. Consequently, the sheet would tend to fly off of the bearing since the attractive forces were insufficient to restrain the sheet once it had, in effect, bounced off of the bearing as a result of an inward movement towards the bearing. On the other hand, an average horizontal pitch of 65 millimeters (x data points) produced insufficient repulsive force so that there would be no guarantee that the sheet would not be damaged during use as a result of contact with the bearing.

Both an average horizontal pitch of 43 millimeters (open square data points) and an average horizontal pitch of 30 millimeters (open diamond data points) produced desirable pressure-versus-spacing curves, with the 30 millimeter average horizontal pitch being somewhat better than the 43 millimeter value since the magnitudes of the repulsive pressures and at least some of the attractive pressures for the 30 millimeter pitch were larger than those of the 43 millimeter pitch. Based on this and similar data, it was determined that the average horizontal pitch should be in the range of 20 to 55 millimeters, preferably 25 to 50 millimeters, and more preferably 30 to 40 millimeters (e.g., approximately 35 millimeters), where, in each case, the end points of the ranges are included within the range.

FIG. 13 shows data for the average orifice size parameter. In this case, an average orifice size of 5 millimeters (solid triangular data points) was found to produce too small a repulsive pressure at small bearing to sheet spacings and an average orifice size of 0.5 millimeters (x data points) was found to produce too large a repulsive pressure.

Both an average orifice size of 3 millimeters (open square data points) and one of 1.4 millimeters (open diamond data points) produced desirable pressure-versus-spacing curves, with the 1.4 millimeter average orifice size being somewhat better than the 3 millimeter size since the magnitudes of both the repulsive and attractive pressures for the 1.4 millimeter average orifice size were larger than those of the 3 millimeter size. Based on this and similar data, it was determined that the average orifice size should be in the range of 1.0 to 4.5 millimeters, preferably 1.0 to 3.5 millimeters, and more preferably 1.25 to 2.25 millimeters, where, in each case, the end points of the ranges are included within the range.

FIG. 14 shows data for average flow rate. In this case, an average flow rate of 900 milliliters/minute/orifice (solid triangular data points) was found to produce too large a repulsive pressure at small bearing to sheet spacings and an average flow rate of 80 milliliters/minute/orifice (x data points) was found to produce too small a repulsive pressure.

Both an average flow rate of 350 milliliters/minute/orifice (open square data points) and 190 milliliters/minute/orifice produced desirable pressure-versus-spacing curves, with the 190 milliliters/minute/orifice average flow rate being somewhat better than the 350 milliliters/minute/orifice average flow rate since lower average flow rates mean less liquid consumption which, in turn, means smaller and thus less expensive equipment is needed to supply the liquid. Based on this and similar data, it was determined that the average flow rate should be in the range of 100 to 800 milliliters/minute/orifice, preferably 125 to 300 milliliters/minute/orifice, and more preferably 150 to 190 milliliters/minute/orifice, where, in each case, the end points of the ranges are included within the range.

Each of these three key parameters, i.e., average horizontal pitch, average orifice size, and average flow rate, provides benefits to the system and thus for some applications, only one or two of the parameters will be in the ranges discussed above. In general terms, the average flow rate parameter is most important, followed by the horizontal pitch and average orifice size parameters in that order.

For many applications, the average horizontal pitch, average orifice size, and average flow rate parameters are preferably all within the above designated ranges, more preferably, all within the above preferred ranges, and most preferably, all within the above more preferred ranges. In keeping with this approach, the data shown for each of FIGS. 12, 13, and 14 is for the "open diamond" parameter values of the other two figures. Thus, for FIG. 12, the average orifice size is 1.4 millimeters and the average flow rate is 190 milliliters/minute/orifice, while for FIG. 13, the average horizontal pitch is 30 millimeters and the average flow rate is 190 milliliters/minute/orifice, and for FIG. 14, the average horizontal pitch is 30 millimeters and the average orifice size is 1.4 millimeters.

In addition to the average horizontal pitch, average orifice size, and average flow rate parameters, the total force applied to a major surface of the sheet, i.e., the pressure integrated over the major surface, is preferably within the range of –0.6 Newtons to +0.6 Newtons, where the endpoints of the range are part of the range. The total force will vary over time as the distance between the sheet and the bearing changes, but preferably remains in the above range. The total force is preferably a measured value, but can also be a calculated value based on a simulation of the system using fluid dynamics software such as the FLUENT program discussed above. This total force range can serve as a useful guide in selecting the number, arrangement, sizes, and flow rates of the orifices. In particular, when choosing orifice flow rates, a rate which generates negative forces but not excessive total forces in view of the other parameters of the system (e.g., total number of orifices, orifice spacing, and orifice size) is preferred, i.e., a total force less than or equal to the upper limit of the above range is preferred.

The above ranges for the average horizontal pitch, average orifice size, and average flow rate parameters have been found to provide effective transport of glass sheets with controlled amounts of variation in the spacing between the glass sheet and the front surface of the bearing. In particular, when non-contact, liquid-ejecting bearings having an average flow rate in the range of 100 to 800 milliliters/minute/orifice, an average orifice size in the range of 1.0 to 4.5 millimeters, and an average horizontal pitch in the range of 20 to 55 millimeters, are tested at a conveyance speed of 15 meters/minute using a glass sheet whose modulus is 73 GPa and whose dimensions are 2 meters long, 2 meters high, and 0.7 millimeters thick, the time-averaged spacing between the sheet and the front face of the bearing at all points on the front face of the bearing is in the range of 500-1000 microns and the time-averaged peak-to-peak variation in the spacing at all points on the front face of the bearing is no greater than 100 microns. Such a small variation relative to the average spacing means that the likelihood of any part of the sheet contacting the bearing during transport of the sheet is negligible. It also means that the chances of the sheet becoming disconnected from the bearing is also negligible.

Figure 15:
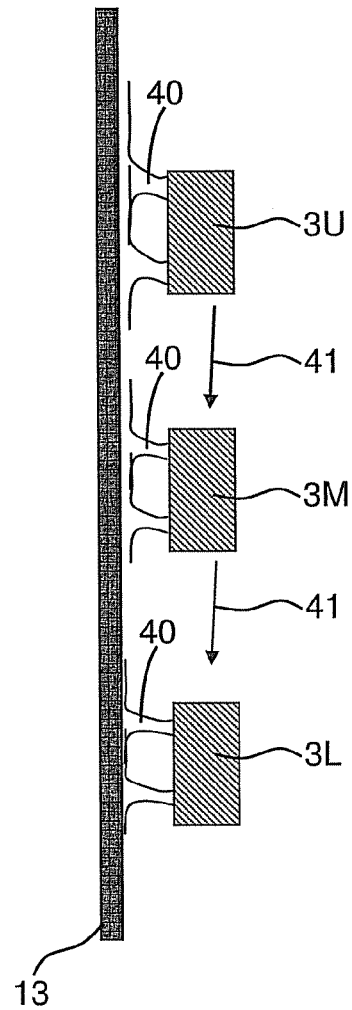
FIG. 15 is a schematic diagram illustrating interaction between individual bearings of an array of non-contact, liquid-ejecting bearings.
Figure 16:
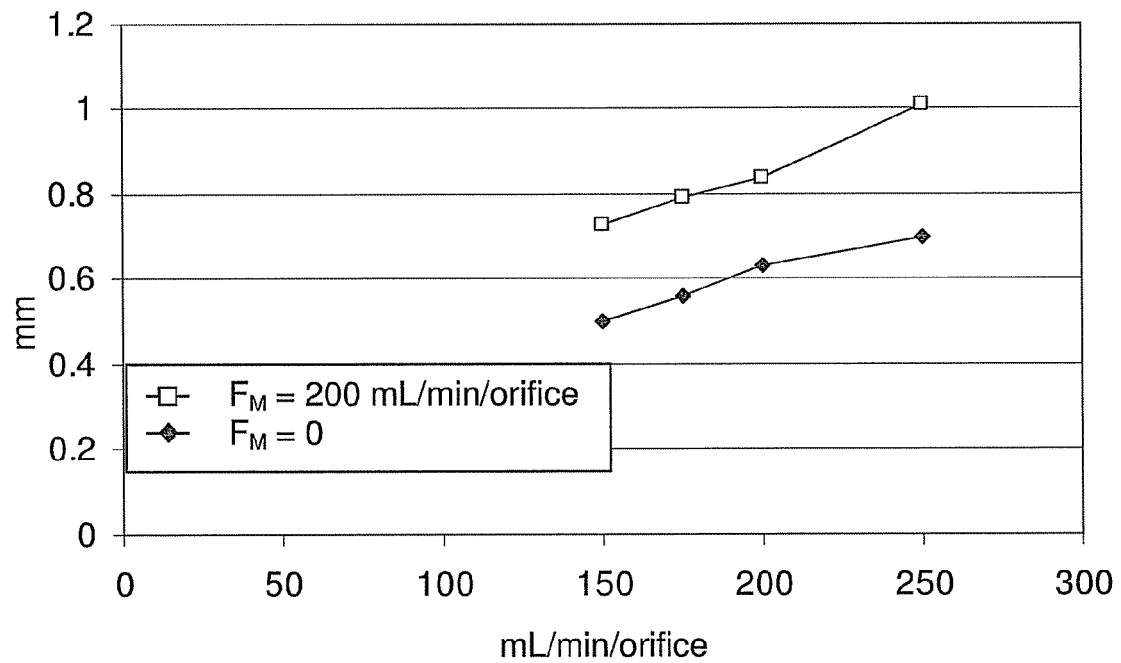
FIG. 16 is a plot of the spacing in millimeters (mm) between a glass sheet and the front face of a non-contact, liquid-ejecting bearing (y-axis) versus average flow rate in milliliters/minute/orifice through the lower of two non-contact, liquid-ejecting bearings (x-axis) for average flow rates of zero and 200 milliliters/minute/orifice through the upper of the two bearings.

As noted above, not only are the phenomena more complex when multiple orifices are involved, but they are also more complex when multiple bearings are used in an array. FIGS. 15 and 16 illustrate the inter-bearing interaction that has been discovered.

In FIG. 15, three bearings 3U, 3M, and 3L eject etching liquid 40 against a glass sheet 13. As schematically illustrated by arrows 41, in practice, the liquid ejected from bearing 3U interacts with that ejected from bearing 3M, and the liquid ejected from bearing 3M (as well as some of the liquid ejected from bearing 3U) interacts with that ejected from bearing 3L. In particular, it has been found that for equal average flow rates for all three bearings, the spacing between glass sheet 13 and the bearing's front surface is greater for bearing 3M and bearing 3L than for bearing 3U, with the spacing for bearing 3L being the largest of them all. (Recall that because of its thinness, glass sheet 13 is highly flexible so that although bearings 3U, 3M, and 3L may be vertically aligned, the lower parts of the sheet can flex away from bearings 3M and 3L to create the larger spacing.)

FIG. 16 quantifies the effect for a two bearing system, e.g., bearings 3M and 3L in FIG. 15. The horizontal axis in FIG. 16 shows the average flow rate through bearing 3L, while the vertical axis plots the spacing between the front surface of bearing 3L and the glass sheet. The solid diamond data points show the spacing for zero flow through bearing 3M, i.e., $F_M=0$. As shown, the spacing to the sheet increases as the average flow rate through the bearing 3L increases.

The open square data points show the effect of a 200 milliliters/minute/orifice average flow rate through bearing 3M. Again, the spacing between bearing 3L and the sheet increases with the average flow rate through bearing 3L, but all of the values are now shifted upward to larger spacings. Accordingly, to maintain substantially equal spacings between the glass sheet and all of the bearings in a bearing array, the operating parameters and/or physical properties of the bearings need to be different. In particular, the operating parameters and/or the physical properties of the bearings need to differ so that the amount of etching liquid ejected by the lower bearing is less than the amount of etching liquid ejected by the upper bearing. This can be accomplished in various ways.

For example, the average liquid flow rate for the lower bearing can be reduced. As one example, using the data of FIG. 16, the combination of a 200 milliliters/minute/orifice average flow rate through bearing 3M and a 150 milliliters/minute/orifice average flow rate through bearing 3L can be seen to produce substantially the same spacing between bearing 3L and the glass sheet as an average flow rate of 250 milliliters/minute/orifice through bearing 3L alone. Similar data can be generated for three or more active bearings, with the average flow rates through the lower bearings being reduced to produce relatively uniform bearing-to-sheet spacings at all bearings. (Note that for some applications, it may be desirable to have unequal spacings which can be achieved by adjusting the average flow rates of the various bearings in accordance with the present disclosure.)

As an alternative to using different flow rates, the physical properties of the bearings can be different. For example, the average horizontal pitch of the lower bearing can be made larger than that of the upper bearing and/or the average orifice size can be made smaller. For many applications, the physical properties approach may be preferable to the flow rate approach since it can avoid the need to individually control/monitor the flow of etching liquid through the individual bearings. However the different flow rates are achieved, it should be noted that they contribute to the uniformity of the etching of the sheet's major surface or surfaces (see below).

B. Top Shower

As discussed above, for many applications, a bearing array may be sufficient to achieve substantially uniform etching of a glass sheet. In particular, a bearing array is normally sufficient when the uppermost bearing of the array is above the top edge of the sheet. Such a bearing ejects etching liquid into empty space, rather than against a major surface of the sheet. Such liquid falls downward onto the sheet where it spreads over the top portion of the sheet.

Figure 17:
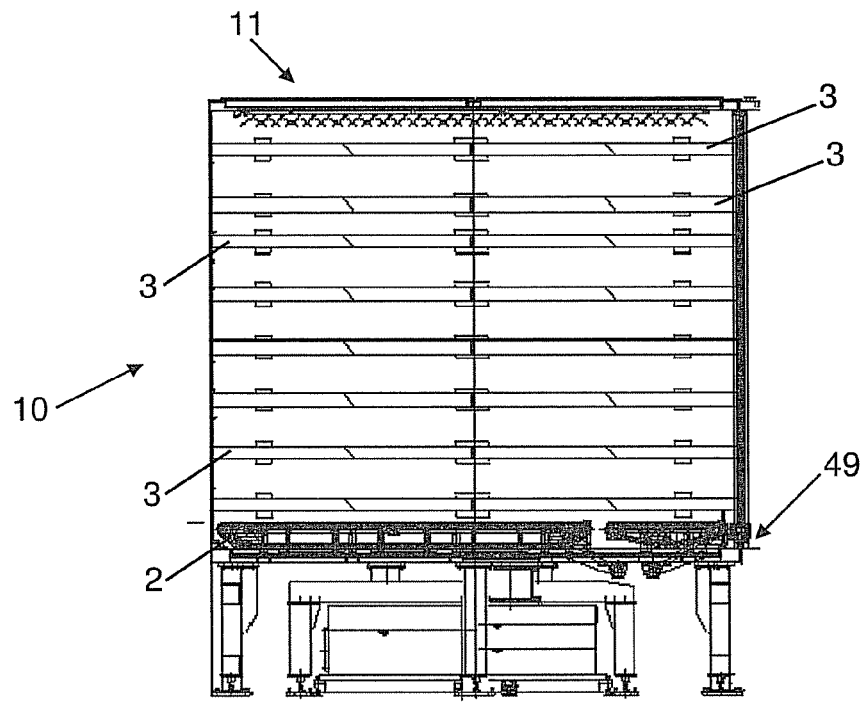
FIG. 17 is a front view of etching apparatus for a glass sheet employing an array of non-contact, liquid-ejecting bearings and a top shower. The apparatus can be used with glass sheets whose top edges are above the uppermost liquid-ejecting bearing, as well as with sheets whose top edges are below the uppermost liquid-ejecting bearing.
Figure 18:
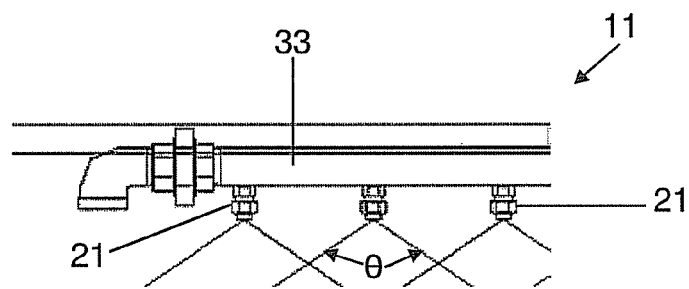
FIG. 18 is a front view showing a portion of the top shower of FIG. 17 in greater detail.

In some cases, however, the uppermost bearing for a particular bearing array may not be above the top edge of particular glass sheets. In such a case, a top shower 11 is used to provide etching liquid for the top portion of the glass. FIGS. 17 and 18 show a suitable construction for such a top shower. As shown in FIG. 17, top shower 11 is located above the uppermost bearing 3 of the bearing array. As shown in FIG. 18, the top shower includes a supply pipe 33 which feeds a series of nozzles 21 arranged along the direction of motion of the glass sheet through the etching apparatus 10.

A variety of nozzles available from various manufacturers can be used to form top shower 11. Because they need to carry an etching solution, the nozzles should be composed of an acid-resistant material, e.g., stainless steel or an acid resistant polymer. Nozzles that produce a flat tip spray pattern, rather than a semi-spherical spray pattern, are generally more efficient. The nozzles can, for example, produce a flat tip spray pattern have a fan angle θ in the range of 90-120 degrees. Nozzles of this type sold by Spraying Systems Co. (Wheaton, Ill.) under the trademark VEEJET have been found to work successfully in practice.

The pitch and flow rates through the nozzles of the top shower are selected to correspond to the flow rates from the orifices of the bearings of the bearing array, the goal being to achieve substantially uniform etching over at least 90% of one or both of the major surfaces of the glass sheet. Generally, for liquid-ejecting bearings of the type described above, the pitch between the nozzles will be in the range of 50-250 millimeters and preferably in the range of 100-150 millimeters, e.g., approximately 115 millimeters. This pitch is approximately twice the pitch of the orifices of the liquid-ejecting bearings.

For nozzles located about 180-200 millimeters above the uppermost liquid-ejecting bearing and having a spray length at the top edge of the glass sheet of approximately 500 millimeters, flow rates in the range of 1.5-5.0 liters/minute/nozzle, preferably 2.0-4.0 liters/minute/nozzle, most preferably 3.0-3.5 liters/minute/nozzle, have been found to work successfully in practice for residence times in the etching station in the range of from about 40 seconds to about 60 seconds, e.g., residence times on the order of 50 seconds. Since the spray from a nozzle normally covers an area corresponding to 10 bearing orifices, these nozzle flow rates generally correspond to orifice flow rates in the range of 200-500 milliliters/minute/orifice, e.g., approximately 350 milliliters/minute/orifice. The flow rates from the top shower and those from the liquid-ejecting bearings are thus of the same order of magnitude and, indeed, are generally quite close in magnitude.

Flow rates different from those described above may, of course, be needed for particular applications of the etching techniques disclosed herein. Based on the present disclosure, persons skilled in the art will have no difficulty in adjusting the flow rates, residence time, and similar parameters to achieve successful etching of glass sheets of a variety of compositions and sizes.

C. Etching Solutions

A variety of etching solutions can be used to increase the surface roughness of the glass. For example, a $NaF/H_3PO_4$ solution of the type disclosed in commonly-assigned U.S. Pat. No. 5,851,366 can be used for this purpose. In practice, a concentrated $NaF/H_3PO_4$ solution can be prepared (e.g., a 0.08M NaF and 0.4M $H_3PO_4$ solution) and diluted with deionized water prior to use (e.g., at a 4:5 ratio $NaF/H_3PO_4$ to water).

In most cases, both sides of the glass sheet are etched and thus the etching solution is supplied to all of the liquid-ejecting bearings, as well as to the top shower when used. In some cases, etching on only one side may be desired. When the etching station only uses liquid-ejecting bearings and does not include a top shower, such one-sided etching can be achieved by providing etching solution to the bearings facing the side of the sheet that is to be etched, while a non-etching liquid, e.g., water, is provided to the opposing bearings. Similarly, when the etching station uses liquid-ejecting bearings in combination with a top shower, etching solution is provided to the bearings facing the side to be etched and to the top shower, while a non-etching solution is provided to the bearings on the other side (second side). Some small amount of etching of the second side will occur because of the etching solution provided to the top shower, but normally this will be acceptable. The non-etching solution, as well as the etching solution, may include one or more additives, such as a biocide to prevent bacterial growth in cases where recycling is performed.

After leaving the etching station, the glass sheet can be rinsed using high and/or low pressure water sprays and then air dried prior to further processing, e.g., inspection and packaging.

D. Fusion Process

As discussed above, the etching systems of the present disclosure are of particular value with regard to glass substrates produced by the fusion process because the process produces sheets having exceptionally smooth surfaces.

As known in the art, the fusion process is one of the basic techniques used to produce sheet glass. See, for example, Varshneya, Arun K., "Flat Glass," Fundamentals of Inorganic Glasses, Academic Press, Inc., Boston, 1994, Chapter 20, Section 4.2, 534-540. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of liquid crystal displays (LCDs).

Figure 19:
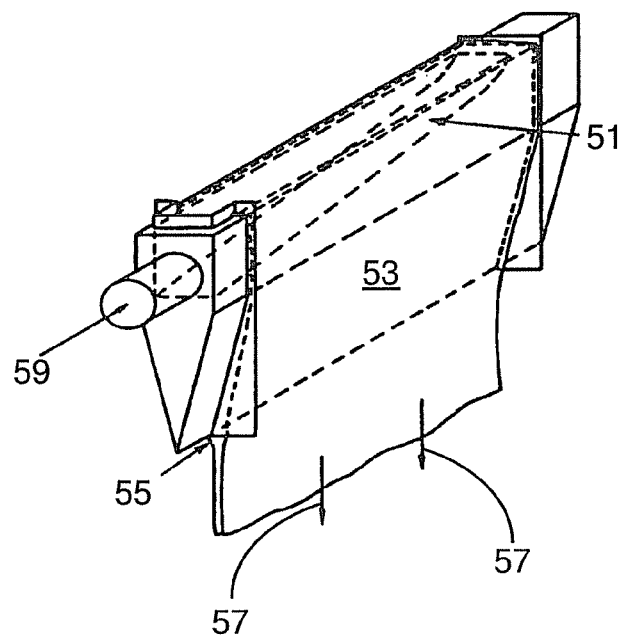
FIG. 19 is a schematic diagram illustrating a representative construction for an isopipe (forming structure) for use in a fusion process for making flat glass sheets.

The fusion process, specifically, the overflow downdraw fusion process, is the subject of commonly assigned U.S. Pat. Nos. 3,338,696 and 3,682,609, to Stuart M. Dockerty, the contents of which are incorporated herein by reference. A schematic drawing of the process of these patents is shown in FIG. 19. As illustrated therein, the system includes a supply pipe 59 which provides molten glass to a collection trough 51 formed in a refractory body 53 known as an "isopipe."

Once steady state operation has been achieved, molten glass passes from the supply pipe to the trough and then overflows the top of the trough on both sides, thus forming two sheets of glass that flow downward and then inward along the outer surfaces of the isopipe. The two sheets meet at the bottom or root 55 of the isopipe, where they fuse together into a single sheet. The single sheet is then fed to drawing equipment (represented schematically by arrows 57), which controls the thickness of the sheet by the rate at which the sheet is drawn away from the root. The drawing equipment is located well downstream of the root so that the single sheet has cooled and become rigid before coming into contact with the equipment.

In terms of the product claims set forth below, it should be noted that glass sheets made by a fusion process can be distinguished from those made by other processes, e.g., sheets made by the float or slot draw processes, because fusion glass has a fusion line where the two sheets which have passed along the outer surfaces of the isopipe (forming structure) meet and join together. Thus, although the etching apparatus and methods disclosed herein can be used with glass sheets made by the other processes, when used on glass sheets made by a fusion process, the resulting product can be identified by (1) determining the surface roughness (e.g., by atomic force microscopy (AFM)) of the product's major surface(s), and (2) examining the product's edges for the presence of a fusion line.

In particular, using the technology disclosed herein, glass sheets made by a fusion process are provided which are at least Gen 8 (i.e., each major surface of the sheet has an area of at least 5.0 square meters) and have at least one major surface whose average surface roughness as determined by atomic force microscopy is in the range of 0.5 to 1.1 nanometers (preferably, in the range of 0.5-0.9 nanometers, most preferably, approximately 0.7 nanometers) over at least 90% (on an area basis) of the central portion of the surface. In certain embodiments, the average surface roughness is within the above ranges for both major surfaces of the sheet.

The average value for the surface roughness can be obtained by, for example, sampling on the order of five points within various regions (e.g., 100 mm×100 mm areas) distributed over the surface of the sheet. As one example, the regions can be located at the following positions relative to a corner (the (0,0) position) of a Gen 10 sheet: (350,75) (2600,75) (345,1300) (2575,1250) (400,2700) (1600,2650) (2600,2800) (1500,1700) (1400,1400). In general terms, the average surface roughness is typically based on an examination of 30-40% of the total area of the sheet. When the same procedure for determining average surface roughness is applied to a fusion glass sheet that has not been subject to the etching treatment disclosed herein, the measured surface roughness values are in the range of 0.2 to 0.3 nanometers, rather than 0.5 to 1.1 nanometers.

In addition to their average surface roughness values, fusion glass sheets that have been etched using the technology disclosed herein can also be characterized in terms of their low levels of variability, specifically, in terms of the standard deviations of their average surface roughness values. Both intra-surface (within one surface) and inter-surface (between corresponding surfaces on different sheets, e.g., between A sides or between B sides of the sheet) values can be considered. Thus, in certain embodiments, the intra-surface standard deviation of the average surface roughness over the 90% central portion of at least one of the sheet's major surfaces is less than or equal to 0.05 nanometers (preferably, less than or equal to 0.04 nanometers, e.g., in the 0.03-0.04 nanometer range). In further embodiments, both surfaces of the sheet have an intra-surface standard deviation for the surface's average roughness that satisfies the above criterion. In other embodiments, the inter-surface standard deviation of the average surface roughness over the 90% central portion of at least one of the sheet's major surfaces is less than or equal to 0.03 nanometers, while in still further embodiments, both surfaces of the sheet have an inter-surface standard deviation for the surface's average roughness that is less than or equal to 0.03 nanometers.

The following, non-limiting examples further illustrate the etching technology disclosed herein.

Example 1

Experiments were performed to determine the dependence of the etching process on the length of time the glass sheet was subjected to the etching solution, i.e., the residence time of the sheet in the etching station. The experiments used an etching solution temperature of 30° C., a conveyor speed of 4.2 meters/minute, and residence times for the sheet in the etching station of 40, 50, and 60 seconds. The etching solution was obtained by mixing 5 parts deionized (DI) water with 4 parts of a solution 0.08M NaF+0.4M $H_3PO_4$ and was applied to both sides and the tops of the sheets using liquid-ejecting bearings and a top shower. The flow rate through the orifices of the bearings was in the range of 125 to 300 mL/min/orifice, i.e., ~200 mL/min/orifice, while that through the top shower was in the range of 3.0-3.5 liters/minute/nozzle. The etching was performed on Gen 10 glass sheets made of Corning Incorporated's EAGLE XG™ LCD glass.

The average surface roughness and intra-sheet standard deviations for these three residence times were: 40 seconds—0.65±0.089 nanometers; 50 seconds—0.69±0.048 nanometers; and 60 seconds—0.72±0.067 nanometers. This data illustrates the robustness of the etching process in that all of these surface roughness values are within the 0.5-1.1 nanometer range and indeed are within the preferred range of 0.5-0.9 nanometers.

Example 2

Experiments were performed to determine the dependence of the etching process on the temperature of the etching solution. The experiments used solution temperatures of 28° C., 33° C., and 38° C., a conveyor speed of 4.2 meters/minute, and a residence time for the sheet in the etching station of 40 seconds. The etch solution was obtained by mixing 5 parts deionized (DI) water with 4 parts of a solution 0.08M NaF+0.4M $H_3PO_4$ and was applied to both sides and the tops of the sheets using liquid-ejecting bearings and a top shower. The etching was performed on Gen 10 glass sheets made of Corning Incorporated's EAGLE XG™ LCD glass. The flow rate through the orifices of the bearings was in the range of 125 to 300 mL/min/orifice, i.e., ~200 mL/min/orifice, while that through the top shower was in the range of 3.0-3.5 liters/minute/nozzle.

Figure 20:
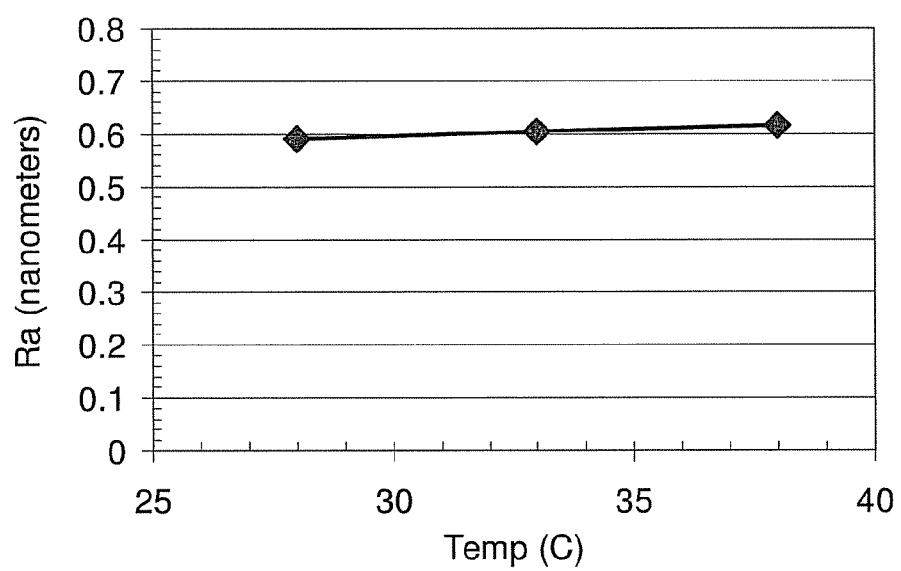
FIG. 20 is a graph which shows that the surface roughness produced by the etching technology disclosed herein is substantially independent of the temperature of the etching solution.

The results are shown in FIG. 20. As can be seen therein, the surface roughness was essentially completely independent of temperature. The temperature independence of FIG. 20 was surprising since in accordance with Arrhenius reaction kinetics, one would have expected to see higher surface roughness values with higher solution temperatures. The lack of a temperature dependence means that the operating temperature of the system can be selected to satisfy other constraints, e.g., constraints relating to the spacings between the liquid-ejecting bearings which spacings can vary with temperature due to expansion and contraction of the bearings and their supporting structure. Also, the temperature independence means that energy does not have to be expended to heat the etching solution to a high operating temperature, which reduces the overall costs of the substrate manufacturing process.

From the foregoing, it can be seen that a robust system has been provided which through the use of a fluidic bearing design and, in some cases, a top shower, enables the application of a chemical treatment to a glass sheet in a vertical or near vertical orientation without surface contact. In particular, the system avoids scratches, stains, and the like which can result from the application of chemical solutions to the pristine surfaces of LCD glasses using rollers.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

| Panel | Spacing (mm) | Flow Rate (liters/min) | Total Force (Newtons) |
|---|---|---|---|
| 3 | 0.3 | 0.68 | +0.48 |
| 4 | 0.4 | 0.81 | −0.30 |
| 5 | 0.7 | 1.00 | −0.82 |
| 6 | 1.0 | 1.10 | −0.55 |
| 7 | 1.3 | 1.13 | −0.39 |

What is claimed is:

1. A glass sheet produced by a fusion process having first and second major surfaces each of which has an area greater than five square meters wherein at least one of the first and second major surfaces has an average surface roughness over at least the central 90% of its area which is in the range of 0.5 nanometers to 1.1 nanometers, and wherein at least one of the first and second major surfaces has an intra-surface standard deviation of its surface roughness over at least the central 90% of its area which is less than or equal to 0.05 nanometers.

2. The glass sheet of claim 1 wherein the first and second major surfaces each have an area greater than 8.5 square meters.

3. The glass sheet of claim 1 wherein each of the first and second major surfaces has an average surface roughness over at least the central 90% of its area which is in the range of 0.5 nanometers to 1.1 nanometers.

4. The glass sheet of claim 1 wherein at least one of the first and second major surfaces has an average surface roughness over at least the central 90% of its area which is in the range of 0.5 nanometers to 0.9 nanometers.

5. The glass sheet of claim 1 wherein each of the first and second major surfaces has an average surface roughness over at least the central 90% of its area which is in the range of 0.5 nanometers to 0.9 nanometers.

6. The glass sheet of claim 1 wherein each of the first and second major surfaces has an intra-surface standard deviation of its surface roughness over at least the central 90% of its area which is less than or equal to 0.05 nanometers.

7. The glass sheet of claim 1 wherein each of the first and second major surfaces is free of scratches and stains resulting from contact with a roller.

* * * * *